United States Patent Office  2,715,144
Patented Aug. 9, 1955

2,715,144

HYDROLYSIS OF UNSATURATED FLUORINE-CONTAINING ETHERS

Robert P. Ruh, Midland, Mich., assignor to The Dow Chemical Company, Midland, Mich., a corporation of Delaware No Drawing. Application June 2, 1950,
Serial No. 165,873

2 Claims. (Cl. 260—593)

This invention relates to the hydrolysis of unsaturated fluorine-containing ethers.

The present invention is based on the discovery that certain unsaturated fluorine-containing ethers undergo hydrolysis to form useful products unknown prior to my invention. The unsaturated fluorine-containing ethers that are hydrolyzed according to the invention are not known to the prior art; their preparation is disclosed in my copending applications entitled "Production of Fluorine-Substituted Ethylenically-Unsaturated Ethers," Serial No. 165,874 and "Production of Ethylenically Unsaturated Fluoro Ethers," Serial No. 165,876, both filed June 2, 1950. Hydrolysis products produced by the method of the invention are useful as organic intermediates.

According to the invention, fluorine-containing aldehydes and ketones are produced by a method that comprises subjecting an unsaturated fluorine-containing ether to the action of water in the presence of sulphuric or hydriodic acid. The unsaturated fluorine-containing ether that is hydrolyzed according to the invention has a molecular structure consisting of one OR group attached to one of two carbon atoms joined through an ethylenic double bond; the three remaining valences of the carbon atoms are satisfied by (a) not more than two hydrogens, (b) not more than two halogens of atomic weight less than 80, including no halogen attached to the carbon bonded to the OR group and not more than one fluorine attached to either carbon atom, and (c) from one to two —CF$_3$ groups. R, as used above, is the residue formed by the removal of one hydroxyl group from an acyclic hydroxy-hydrocarbon having not more than four carbon atoms. Accordingly, it will be seen that the unsaturated fluorine-containing ethers hydrolyzed according to the invention correspond to the general formula $$\text{CF}_3-\overset{b}{\text{C}}=\overset{d}{\text{C}}-a$$

in which one of the substituents b and d is hydrogen or a halogen of atomic weight less than 80 (i. e., fluorine, chlorine or bromine), and the other is OR, wherein R has the meaning hereinbefore indicated, and a is hydrogen, —CF$_3$ or, when d is not OR, a halogen of atomic weight between 35 and 80 (i. e., chlorine or bromine).

A preferred embodiment of the invention involves the hydrolysis of an unsaturated fluorine-containing ether whose molecular structure consists of a carbon chain of three carbon atoms, to one of which are attached three fluorines and to another of which is attached one OR group. The two remaining valences of the chain carbon atoms are satisfied by not more than two halogens of atomic weight less than 80, including no halogen attached to the carbon atom bonded to the OR group and not more than one fluorine attached to either carbon atom, and not more than two hydrogens.

Although the invention is not limited by the following theoretical explanation, it is believed that the reactions involved in the process of the invention are a hydrolysis and a molecular rearrangement. The hydrolysis and molecular rearrangement are illustrated by Equation 1, below, which shows the production of 3,3,3-trifluoropropionaldehyde from 3,3,3-trifluoropropen-1-yl methyl ether:

(1)
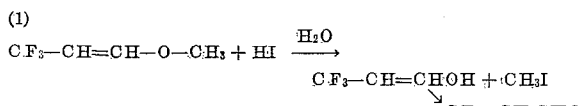

Hydrolysis products produced according to the invention are believed to be new compositions of matter. It will be seen from the above discussion that these hydrolysis products are either ketones or aldehydes and have the general formula

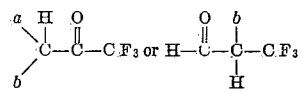

in which a and b have the meanings hereinbefore set forth. Examples of novel compounds represented by the above formulas include 3,3,3-trifluoropropionaldehyde and 1-chloro-3,3,3-trifluoro acetone. Other such compounds are produced by the hydrolysis of unsaturated ethers, hereinbefore defined, which are produced as described in my above-identified applications.

The unsaturated fluorine-containing ethers available for hydrolysis according to the invention are characterized more fully in my copending applications identified above. The term "residue formed by the removal of one hydroxyl from an acyclic hydroxy-hydrocarbon having not more than four carbon atoms" is used to include such residues formed by removal of one OH group of the simple aliphatic alcohols having not more than one ethylenic double bond, and no non-ethylenic unsaturation, aliphatic glycols, and glycerine. Ordinarily, for purposes of the present invention it is preferred that such residue be derived from a saturated, acyclic, monohydroxy-hydrocarbon, because unsaturated ethers containing such units are the least expensive.

The reaction of the invention proceeds at room temperature, but the rate of reaction is a direct function of temperature, so that it is usually preferred to employ an elevated temperature. In some instances it may be advantageous to carry out the reaction in a bomb at a temperature as high as about 200° C., but it is ordinarily preferred to use a temperature not higher than about 150° C. It is most preferred to carry out the reaction of the invention under atmospheric pressure reflux, so that the reaction proceeds at the reflux temperature for the reaction mixture.

When the reaction is conducted in a bomb at an elevated temperature, superatmospheric pressure develops in the course of the reaction. This, apparently, is an immaterial result of carrying out the reaction in this way, as the pressure has no known effect on the rate of reaction or on the yield.

When the reaction is carried out by the most preferred method (i. e., under reflux at atmospheric pressure) to form an aldehyde or ketone, the product formed is conveniently removed from the reaction vessel in the course of the reaction. A simple method is then available for determining the endpoint of the reaction: a sample of the product being removed from the reaction vessel is mixed with 2,4-dinitrophenyl hydrazine; the endpoint has been reached when the hydrazone does not appear. In some instances it may be advantageous to add a compound that forms a low boiling azeotrope with the hydrolysis product so that a mixture comprising the product and added compound can be removed without the removal of other substances of the reaction mixture. The time required for substantial completion of hydrolysis is ordinarily at least one hour, and more commonly at least about three hours. The process can be conducted for any desired reasonable time (e. g., as much as a week), although it is usualy economically preferred that it be stopped after not more than about fifty hours.

As has been indicated above, hydrolysis is carried out in the presence of aqueous sulphuric acid or hydriodic acid. Other hydrolysis catalysts ordinarily used are not suitable because of the difficulty with which hydrolysis proceeds. When hydriodic acid is the catalyst at least one mol of HI is employed per mol of the ether to be hydrolyzed because the acid is consumed as hydrolysis proceeds; it forms iodides with the alcohols released from the ether. When sulphuric acid is the hydrolysis agent only a catalytic amount need be used (e. g., from about 0.5 to about 3 mol per cent based on the unsaturated ether). Whichever hydrolyzing agent is employed, a trace of water should be present to initiate hydrolysis; as the water is regenerated in the course of the reaction only a small amount (e. g., 1 or 2 weight per cent) is required.

The following examples illustrate preferred embodiments, but are not to be construed as limiting the invention:

Example 1

An unsaturated ether was hydrolyzed according to the following procedure:

A mixture of constant boiling hydriodic acid (16.6 grams of an acid that was 57 weight per cent HI) and 3,3,3-trifluoropropenyl methyl ether (13 grams) was refluxed gently for about three and one-fourth hours, and hydrolysis products were separated (as formed) by distillation. The 3,3,3-trifluoropropionaldehyde produced was dissolved in water and separated from the organic layer; this aldehyde, in as pure a form as possible, was then distilled from the solution, yielding a total of 8.6 grams of material that was the desired aldehyde and 2.1 weight per cent of water (this indicated a yield of 77 per cent). Pure 3,3,3-trifluoropropionaldehyde (4.5 grams) was recovered from a 5.7 gram sample of the wet material identified above by refluxing the material through a condenser packed with dry calcium chloride. The pure compound had the following properties: boiling point 56.4° C. at 735.8 mm. Hg; $n_D^{25}$ 1.3090; density at 25° C. 1.3009 grams per cc.; molecular refraction observed 16.46: theory 16.55 (based on an atomic refraction for fluorine of 1.26).

Example 2

A procedure similar to that described in Example 1 was employed to hydrolyze the lower-boiling of the two isomeric 3,3,3-trifluoropropenyl ethyl ethers (25.0 grams) to 3,3,3-trifluoropropionaldehyde by the action of constant boiling hydriodic acid (30.5 grams of an acid that was 57 weight per cent HI). Distillation of the hydrolysis products formed yielded an azeotropic mixture of the desired aldehyde and ethyl iodide. This azeotrope was redistilled to produce 20.5 grams of a material which proved to be a pure form of the azeotrope. 3,3,3-trifluoropropionaldehyde was identified in this mixture by formation of the hydrazone with 2,4-dinitrophenyl hydrazine.

The higher-boiling isomer of 3,3,3-trifluoropropenyl ethyl ether (14.5 grams) was hydrolyzed with constant boiling hydriodic acid (21.3 grams of an acid that was 57 weight per cent HI) by a procedure similar to that described in the preceding paragraph. The product gave a positive test for aldehyde with 2,4-dinitrophenyl hydrazine.

Example 3

A mixture of cis and trans 1-chloro-2-methoxy-3,3,3-trifluoropropene (a total of 92.0 grams) was refluxed with constant boiling hydriodic acid (90 grams) and hydrolysis products were recovered as described in Example 1. Fractionation of the final dry hydrolysis product yielded 21 grams of 1-chloro-3,3,3-trifluoroacetone (boiling point 63.8° C. at 751 mm. Hg; $n_D^{25}$ 1.3431; density at 25° C. 1.4467 grams per cc.; molecular refraction observed 21.40: theory 21.41).

1-chloro-2-ethoxy-3,3,3-trifluoropropene (19 grams) was hydrolyzed by refluxing with constant boiling hydriodic acid (22 grams), using a procedure similar to that of the preceding paragraph. The aqueous layer gave no test for an aldehyde with a Schiff's reagent, but did form a solid 2,4-dinitrophenyl hydrazone. This shows that hydrolysis occurred, and formed a ketone.

I claim:

1. A method of producing fluorine-containing aldehydes and ketones that comprises subjecting a fluorine-containing ether having the general formula

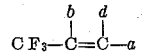

in which one of the substituents $b$ and $d$ is a member of the group consisting of hydrogen and halogens of atomic weight less than 80 and the other is OR, and $a$ is a member of the group consisting of hydrogen, —CF$_3$, and halogens of atomic weight between 35 and 80, provided that $a$ is not halogen when $d$ is OR, wherein R is the residue formed by the removal of one hydroxyl group from an acyclic hydroxy-hydrocarbon having not more than four carbon atoms to the action of water in the presence of a strong mineral acid of the group consisting of sulfuric and hydriodic.

2. A method as claimed in claim 1 in which the hydroxy-hydrocarbon residue is from a saturated, acyclic, monohydroxy-hydrocarbon.

References Cited in the file of this patent

UNITED STATES PATENTS

| | | |
|---|---|---|
| 2,533,172 | McKinley | Dec. 5, 1950 |
| 2,568,500 | Husted et al. | Sept. 18, 1951 |

FOREIGN PATENTS

| | | |
|---|---|---|
| 613,465 | Germany | May 20, 1935 |

OTHER REFERENCES

Granacher et al., Helv. Chim. Acta., vol. 32, pgs. 703–713 (1949).